US00RE50616E

(19) United States
(12) Reissued Patent
Bergman et al.

(10) Patent Number: US RE50,616 E
(45) Date of Reissued Patent: Oct. 7, 2025

(54) TRIPOD CAMERA MOUNT

(71) Applicant: GoPro, Inc., San Mateo, CA (US)

(72) Inventors: Senka Agic Bergman, Montara, CA (US); Nicholas Vitale, Foster City, CA (US); Erik Jorgensen, San Francisco, CA (US)

(73) Assignee: GoPro, Inc., San Mateo, CA (US)

(21) Appl. No.: 29/827,581

(22) Filed: Feb. 21, 2022

Related U.S. Patent Documents

Reissue of:
(64) Patent No.: Des. 852,874
Issued: Jul. 2, 2019
Appl. No.: 29/648,880
Filed: May 24, 2018

U.S. Applications:
(63) Continuation of application No. 29/797,572, filed on Jul. 1, 2021, now Pat. No. Re. 49,005, which is an
(Continued)

(51) LOC (15) Cl. ..... 16-05
(52) U.S. Cl.
USPC ..... D16/243
(58) Field of Classification Search
USPC ..... D16/219, 237, 244, 245; D14/238, 253
(Continued)

(56) References Cited

U.S. PATENT DOCUMENTS 5,341,185 A * 8/1994 Nakatani ..... F16M 11/28 248/169
D415,805 S 10/1999 Wygonik
(Continued)

FOREIGN PATENT DOCUMENTS

CN 300710506 11/2007
CN 301939756 S 5/2012
(Continued)

OTHER PUBLICATIONS

GoPro Volta Tripod, https://www.amazon.com/GoPro-Volta-Official-Accessory/dp/B09XY38VG2?th=1, Apr. 14, 2022 (Year: 2022) 11 pages.
(Continued)

*Primary Examiner* — Philip S Hyder
(74) *Attorney, Agent, or Firm* — Young Basile Hanlon & MacFarlane, P.C.

(57) CLAIM

The ornamental design for tripod camera mount[.] as shown and described.

DESCRIPTION

FIG. 1 is a front, top, and right perspective view of a tripod camera mount;
FIG. 2 is a rear, bottom, and left perspective view thereof;
FIG. 3 is a front view thereof;
FIG. 4 is a rear view thereof;
FIG. 5 is a left view thereof;
FIG. 6 is a right view thereof;
FIG. 7 is a top view thereof; and,
FIG. 8 is a bottom view thereof.
*FIG. 9 is a front, top and right perspective view of an alternate embodiment of the tripod camera mount;*
*FIG. 10 is a rear, bottom, and left perspective view thereof;*
*FIG. 11 is a front view thereof;*
*FIG. 12 is a rear view thereof;*
*FIG. 13 is a right view thereof;*
*FIG. 14 is a left view thereof;*
*FIG. 15 is a top view thereof;*
*FIG. 16 is a bottom view thereof.*
*FIG. 17 is a front, top and right perspective view of the alternate embodiment of the tripod camera mount;*
*FIG. 18 is a rear, bottom, and left perspective view thereof;*
*FIG. 19 is a front view thereof;*
*FIG. 20 is a rear view thereof;*
*FIG. 21 is a right view thereof;*
*FIG. 22 is a left view thereof;*
*FIG. 23 is a top view thereof;*
(Continued)

[NEW]

*FIG. 24 is a bottom view thereof.*
*FIG. 25 is a front, top and right perspective view of the alternate embodiment of the tripod camera mount, wherein the components are shown in an expanded position;*
*FIG. 26 is a bottom, rear, and right view thereof;*
*FIG. 27 is rear view thereof;*
*FIG. 28 is a front view thereof;*
*FIG. 29 is a right view thereof;*
*FIG. 30 is a left view thereof;*
*FIG. 31 is atop view thereof; and,*
*FIG. 32 is a bottom view thereof.*

The ornamental design which is claimed is shown in solid lines in the drawings. The broken lines in the drawings form no part of the claimed design. Broken lines formed by equal length dashes (i.e., dash-dash) show unclaimed subject matter. Broken lines form by unequal length dashes (i.e., dash-dot) define bounds of the claimed design.

1 Claim, 29 Drawing Sheets

Figure 1:
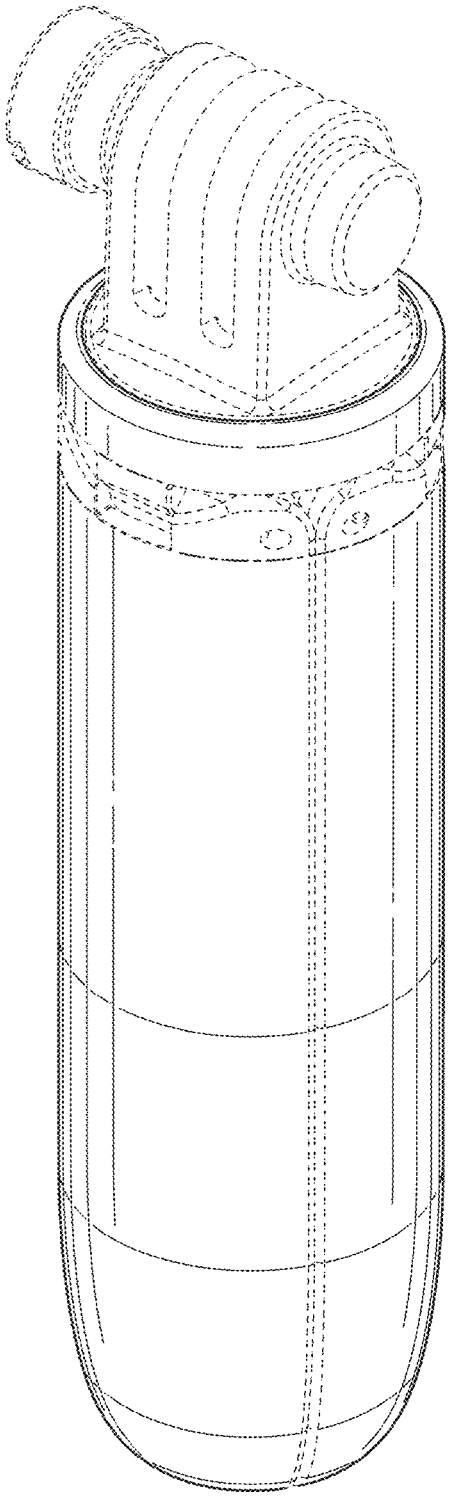
Figure 2:
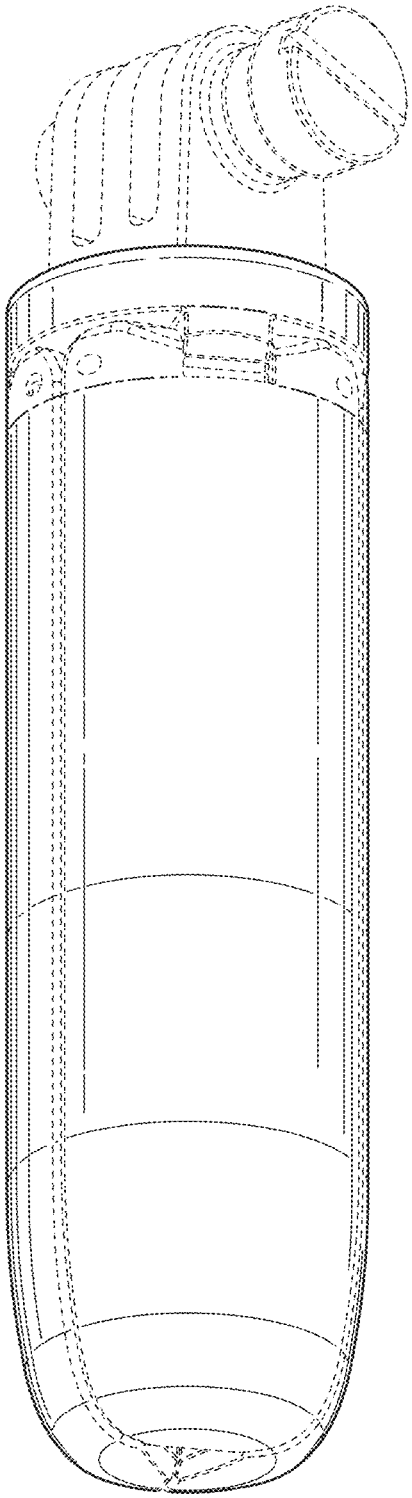
Figure 3:
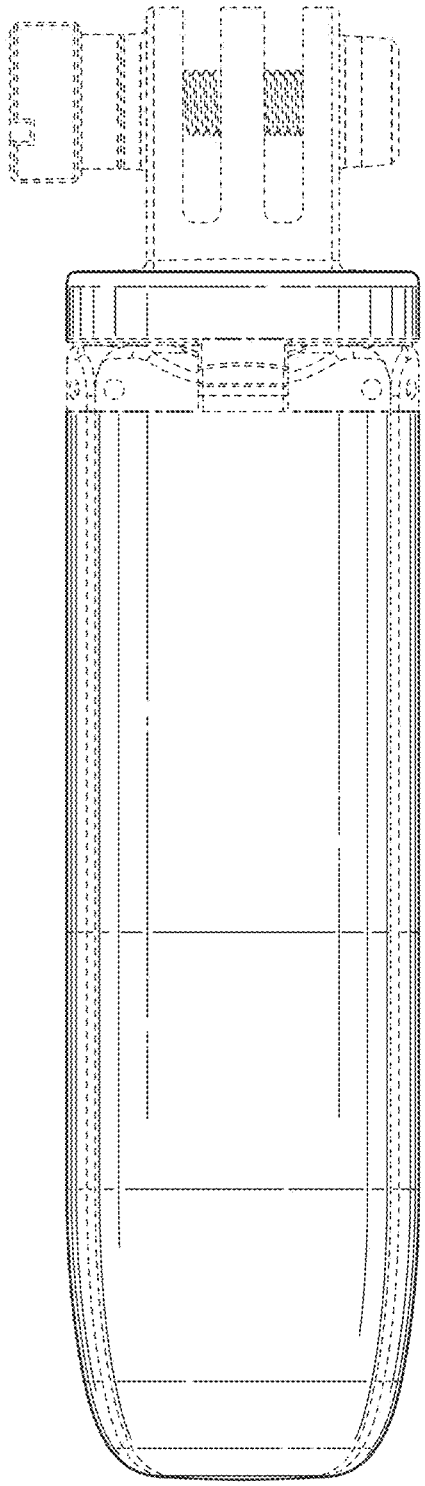
Figure 4:
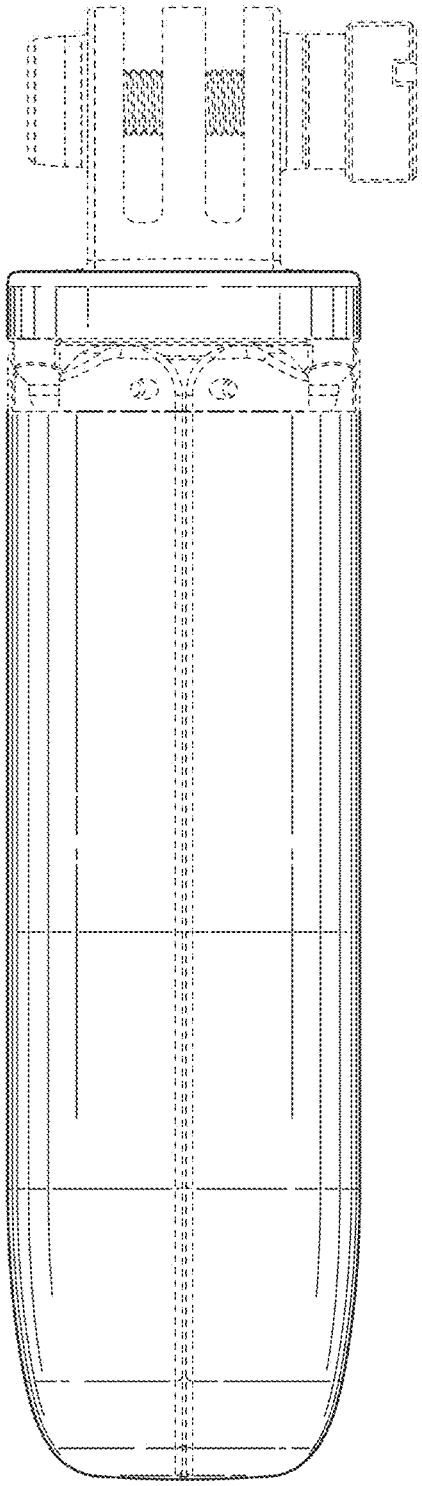
Figure 5:
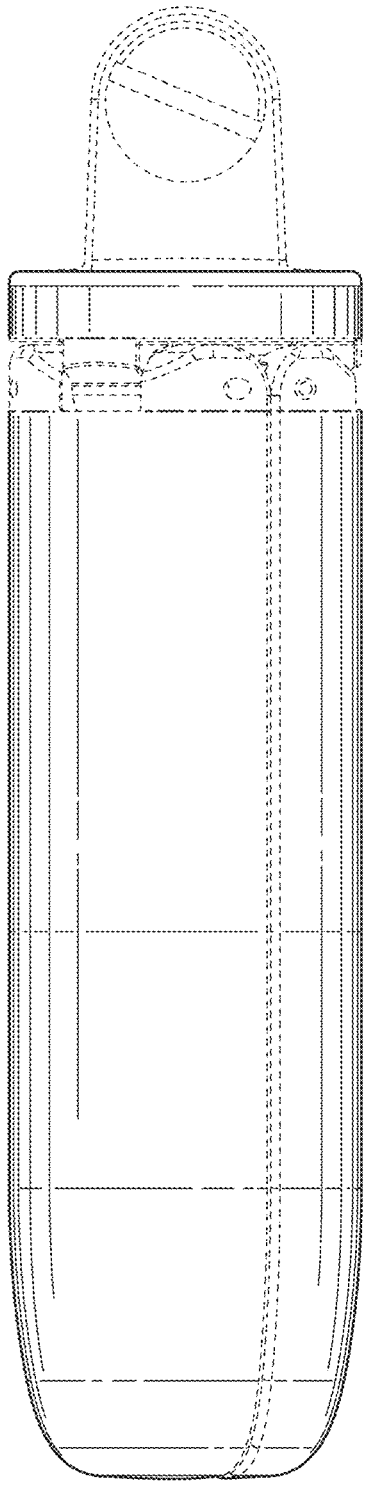
Figure 6:
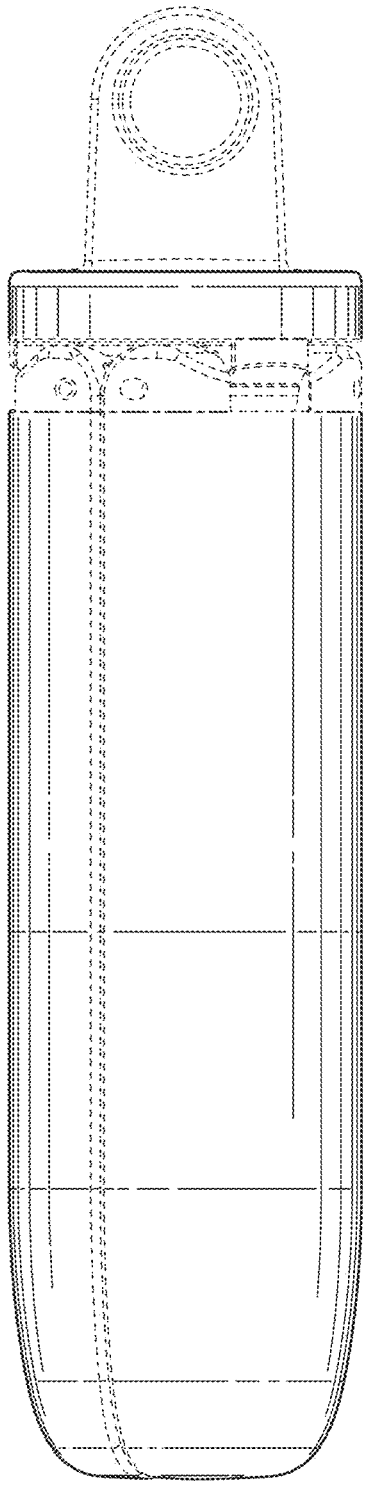
Figure 7:
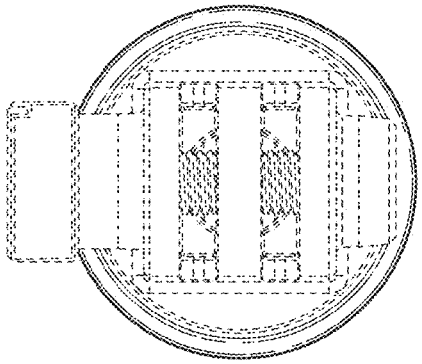
Figure 8:
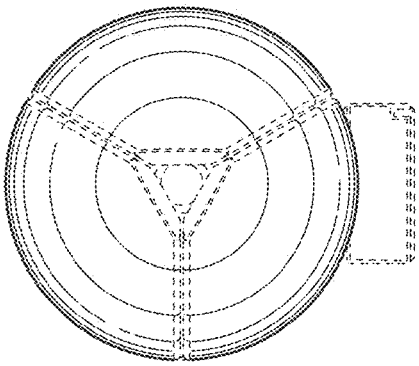

Matter enclosed in heavy brackets [ ] appears in the original patent but forms no part of this reissue; matter printed in italics indicates the additions made by reissue.

Related U.S. Application Data application for the reissue of Pat. No. Des. 852,874, which is a continuation of application No. 29/596,331, filed on Mar. 7, 2017, now Pat. No. Des. 822,092.

(58) Field of Classification Search
CPC ..... F16M 11/046; F16M 11/24; F16M 2200/024; F16M 2200/028
See application file for complete search history.

(56) References Cited

U.S. PATENT DOCUMENTS

| | | | | | |
|---|---|---|---|---|---|
| D463,877 | S | * | 10/2002 | Kung | D26/38 |
| D505,442 | S | | 5/2005 | Watters | |
| D508,938 | S | | 8/2005 | Watters | |
| D532,436 | S | | 11/2006 | Kruse | |
| D533,578 | S | | 12/2006 | Oka | |
| D552,660 | S | | 10/2007 | Lee | |
| D620,491 | S | * | 7/2010 | Wu | D14/411 |
| D632,720 | S | | 2/2011 | Barker | D16/244 |
| D670,752 | S | * | 11/2012 | Barber | D16/242 |
| D705,468 | S | | 5/2014 | Tompkin | |
| D714,775 | S | | 10/2014 | Ahn | |
| D718,365 | S | | 11/2014 | Hayashi | |
| D739,456 | S | | 9/2015 | Poli | |
| 9,298,066 | B1 | * | 3/2016 | Fan | G03B 17/561 |
| D766,230 | S | * | 9/2016 | Shepard | D14/253 |
| D772,027 | S | * | 11/2016 | Chi Man | D8/14 |
| D800,206 | S | | 10/2017 | Ham | |
| 9,810,974 | B2 | * | 11/2017 | Chi | G03B 17/561 |
| D821,483 | S | * | 6/2018 | Vitale | D16/244 |
| D822,092 | S | * | 7/2018 | Bergman | D16/243 |
| 10,047,901 | B2 | * | 8/2018 | Hida | F16M 11/242 |
| D852,874 | S | | 7/2019 | Bergman | |
| D857,085 | S | * | 8/2019 | Yamaguchi | D16/244 |
| D860,298 | S | * | 9/2019 | Balmer | D16/244 |
| D882,672 | S | | 4/2020 | Xia | |
| D928,220 | S | | 8/2021 | Liang | |
| D955,466 | S | | 6/2022 | Wada | |
| D969,203 | S | | 11/2022 | Shen | |
| D973,128 | S | | 12/2022 | Wang | |
| D976,305 | S | | 1/2023 | Xu | |
| D982,065 | S | | 3/2023 | Muhlenkamp, IV | |
| D985,040 | S | | 5/2023 | Peng | |
| D991,327 | S | | 7/2023 | Wang | |
| D996,507 | S | | 8/2023 | Zhang | |
| D1,005,377 | S | | 11/2023 | Wang | |
| D1,009,017 | S | | 12/2023 | Cheny | |
| D1,034,768 | S | | 7/2024 | Hao | |
| 2005/0092878 | A1 | * | 5/2005 | Murray | G01C 15/002 248/171 |
| 2017/0370518 | A1 | * | 12/2017 | Hida | F16M 11/2021 |
| 2019/0128469 | A1 | * | 5/2019 | Lu | F16M 11/2064 |
| 2022/0357640 | A1 | | 11/2022 | Chen | |

FOREIGN PATENT DOCUMENTS

| | | | |
|---|---|---|---|
| CN | 302895830 | S | 7/2014 |
| CN | 203927319 | U | 11/2014 |
| CN | 303151643 | S | 4/2015 |
| CN | 303169679 | S | 4/2015 |
| CN | 303368492 | S | 9/2015 |
| CN | 303454033 | S | 11/2015 |
| CN | 303565158 | S | 1/2016 |
| CN | 303719623 | S | 6/2016 |
| CN | 303739365 | S | 7/2016 |
| CN | 303877711 | S | 10/2016 |
| CN | 303988497 | S | 12/2016 |
| CN | 303988499 | S | 12/2016 |
| KR | 20150001235 | | 10/2015 |

OTHER PUBLICATIONS

Smatree Go Pro Accessories—Smapole Q3 Telescoping Go Pro Pole. [online] Retrieved Jan. 19, 2018 from URL:https:// www.alibaba.com/product-detail/Smatree-Go-pro-Accessories-SmaPole-Q3 60258252130.html (14 pages).

Luxebell Selfie Stick Telescoping with Tripod Stand Mount for Gopro Hero4 3+3. [online] Published on Nov. 8, 2016. Retrieved Jan. 19, 2018 from URL:http://www.luxebell.net/home/27-luxebell-selfie-stick-telescoping-with-tripod-stand-mount-for-gopro-hero4-3-3-hero-lcd-session-cell-phones.html (3 pages).

* cited by examiner

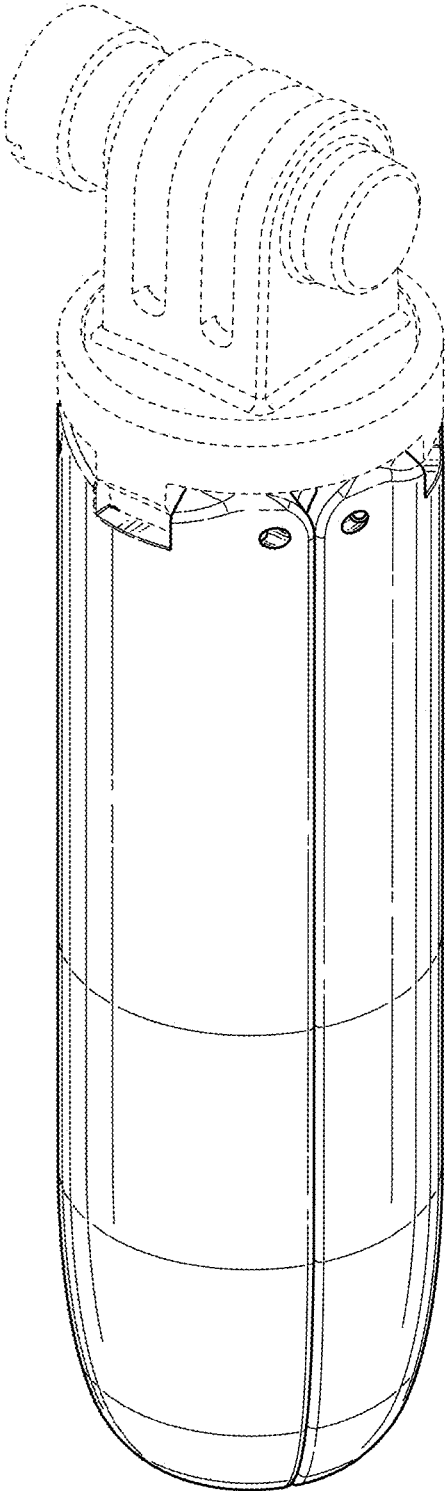
FIG. 9
[NEW]

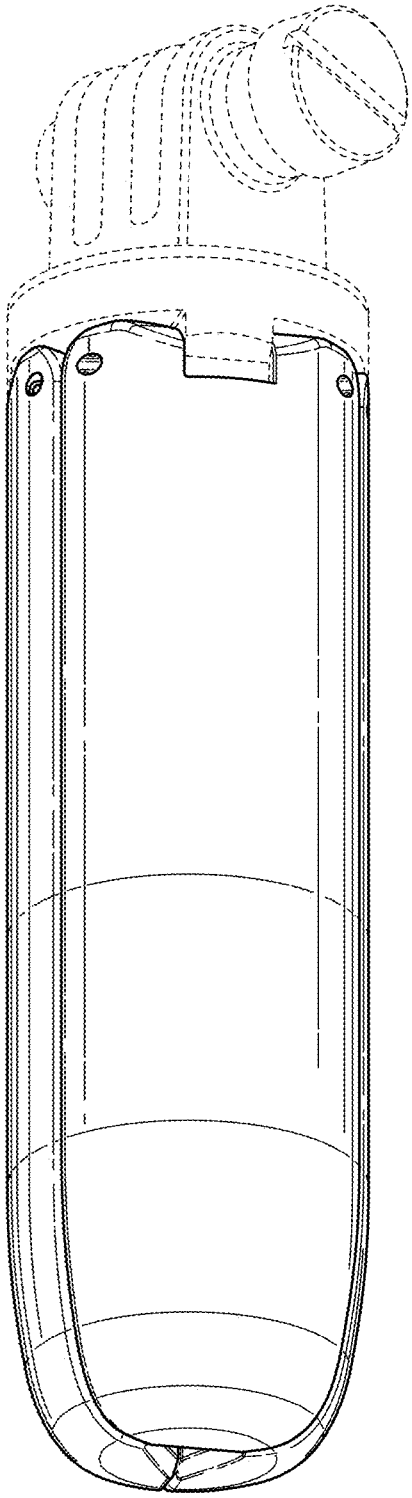
FIG. 10
[NEW]

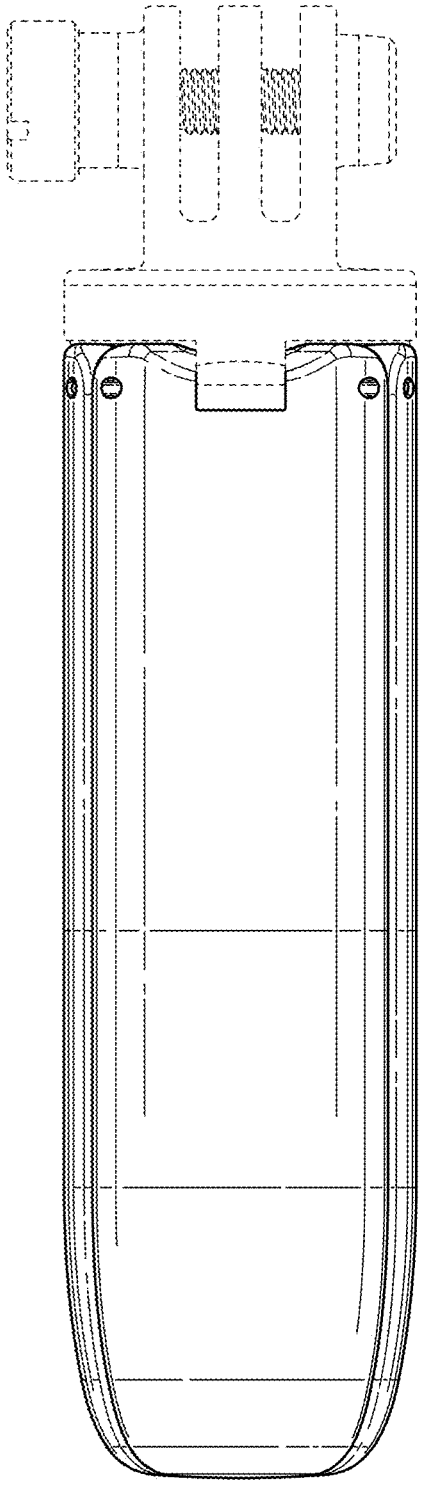
FIG. 11
[NEW]

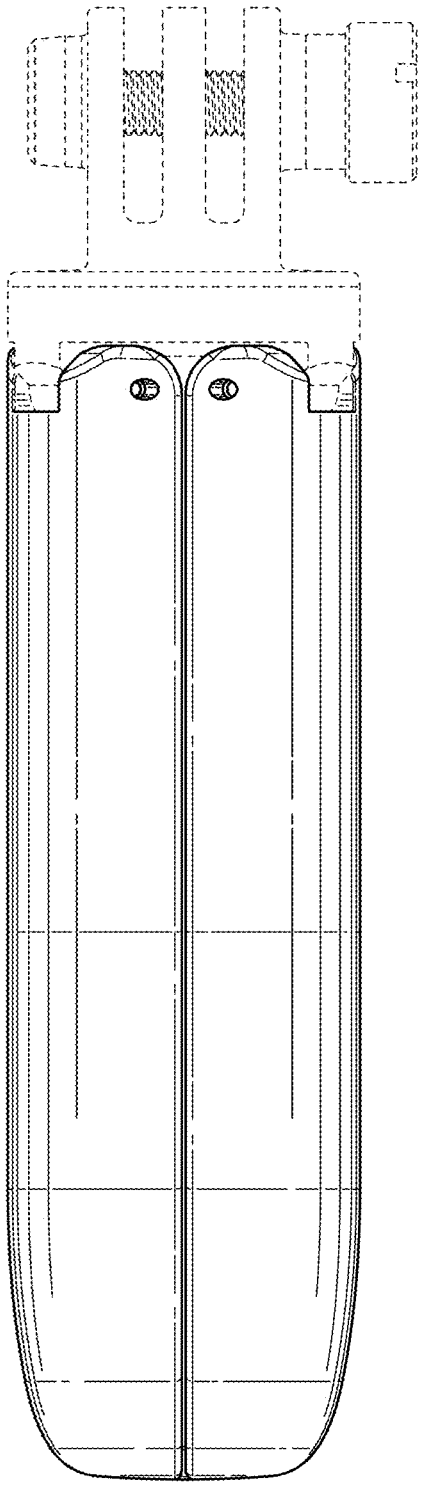
FIG. 12
[NEW]

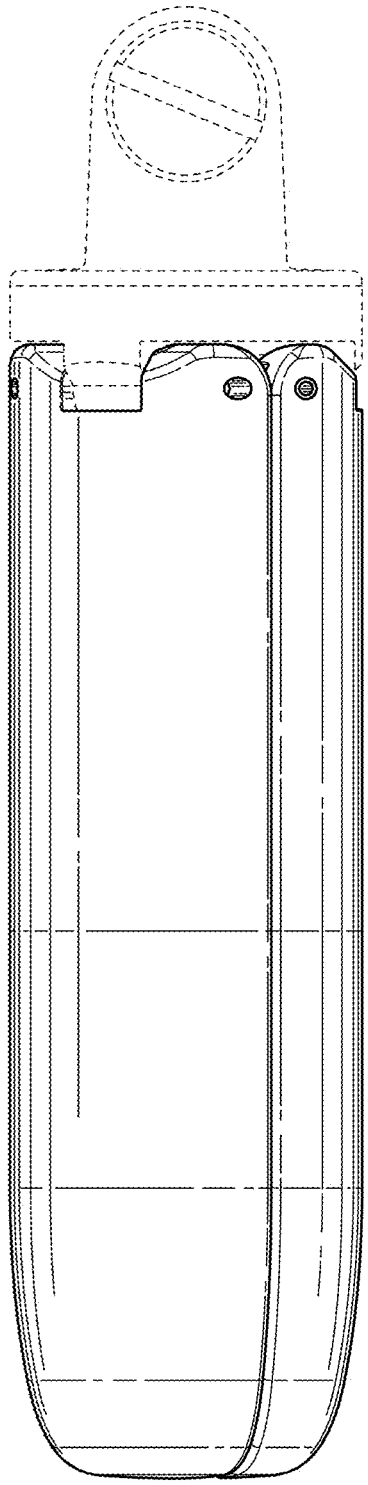
FIG. 13
[NEW]

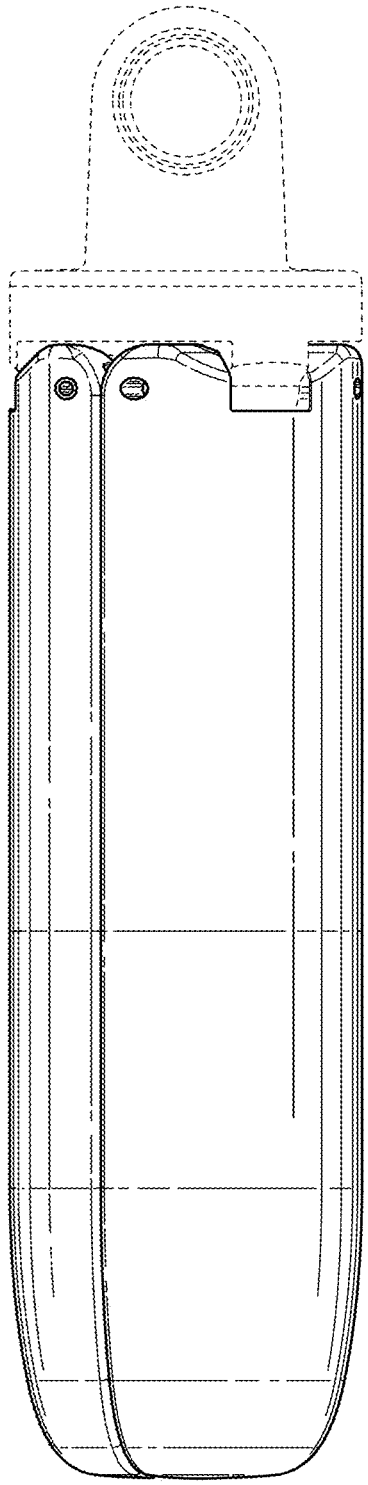
FIG. 14
[NEW]

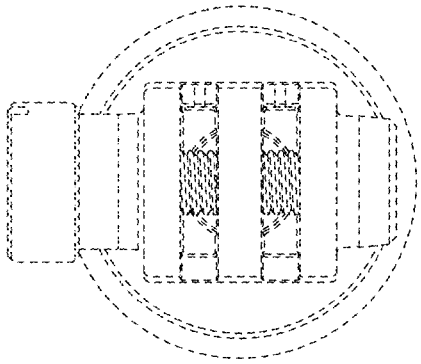
FIG. 15
[NEW]
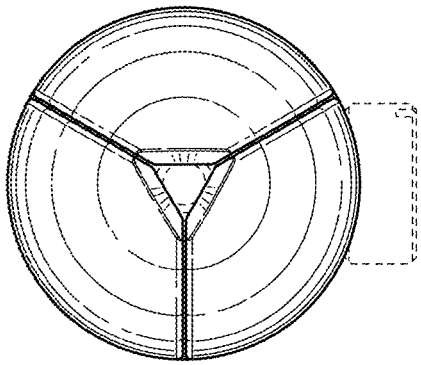
FIG. 16
[NEW]

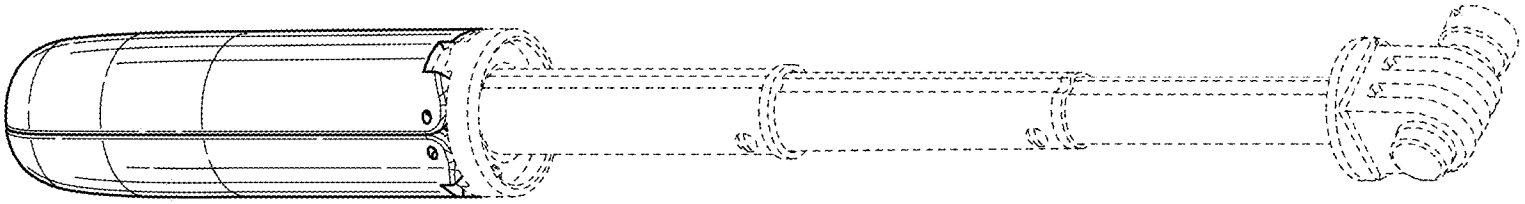
FIG. 17
[NEW]

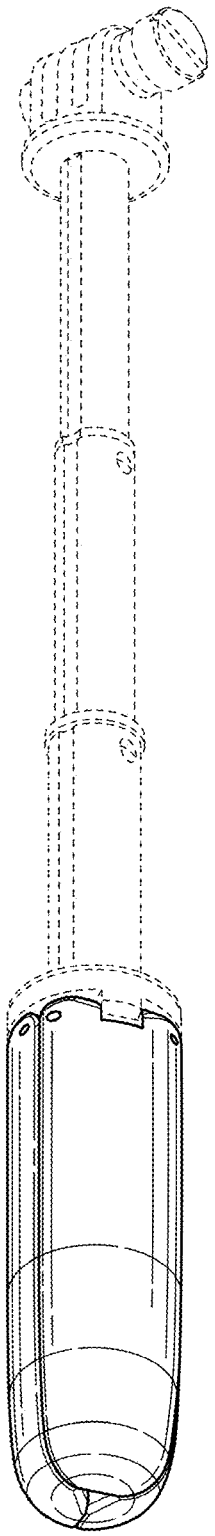
FIG. 18
[NEW]

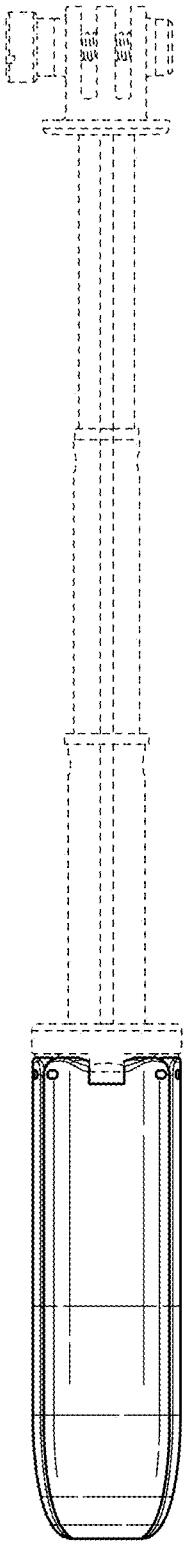
FIG. 19
[NEW]

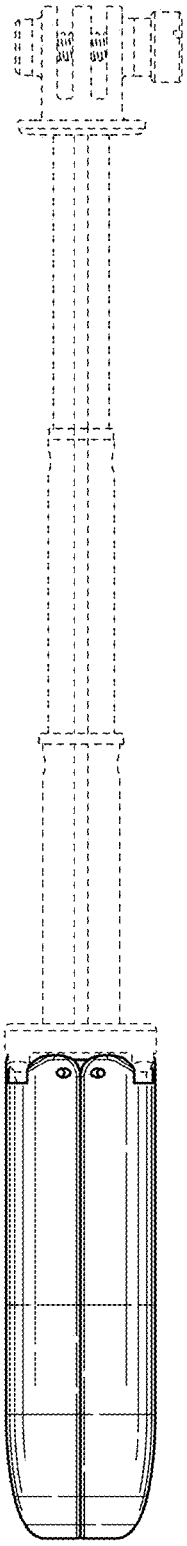
FIG. 20
[NEW]

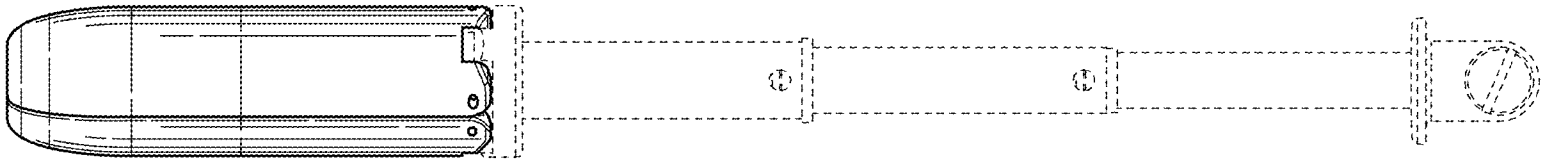
FIG. 21
[NEW]

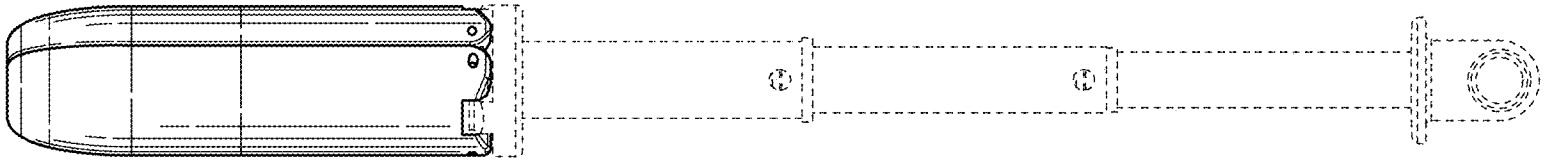
FIG. 22
[NEW]

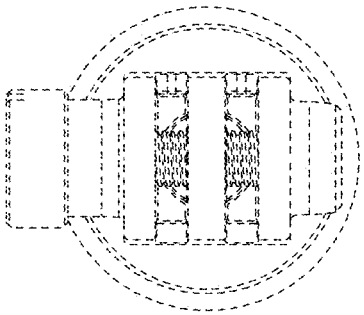
FIG. 23
[NEW]
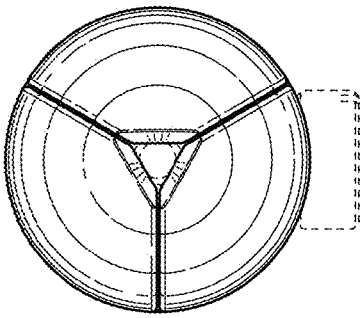
FIG. 24
[NEW]

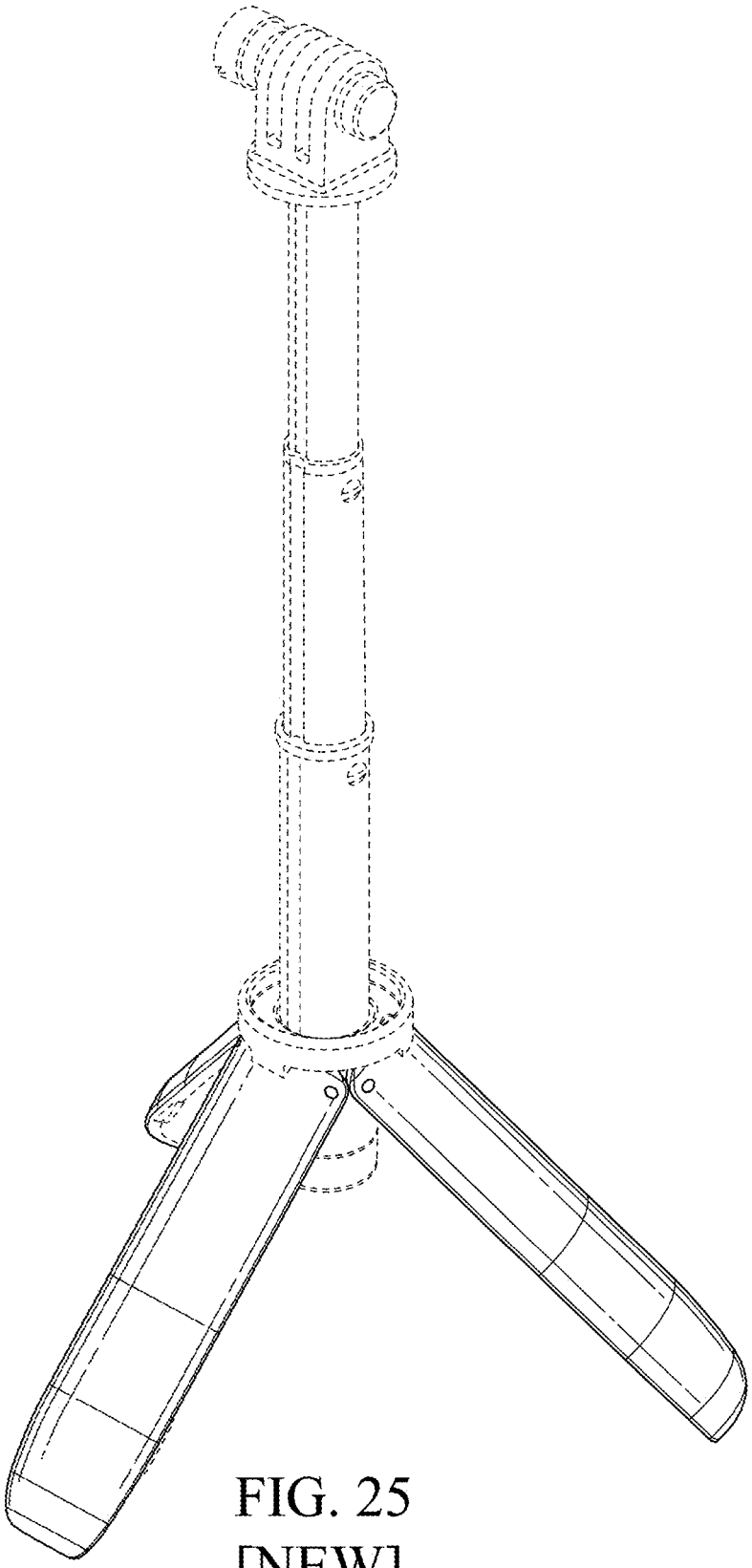
FIG. 25
[NEW]

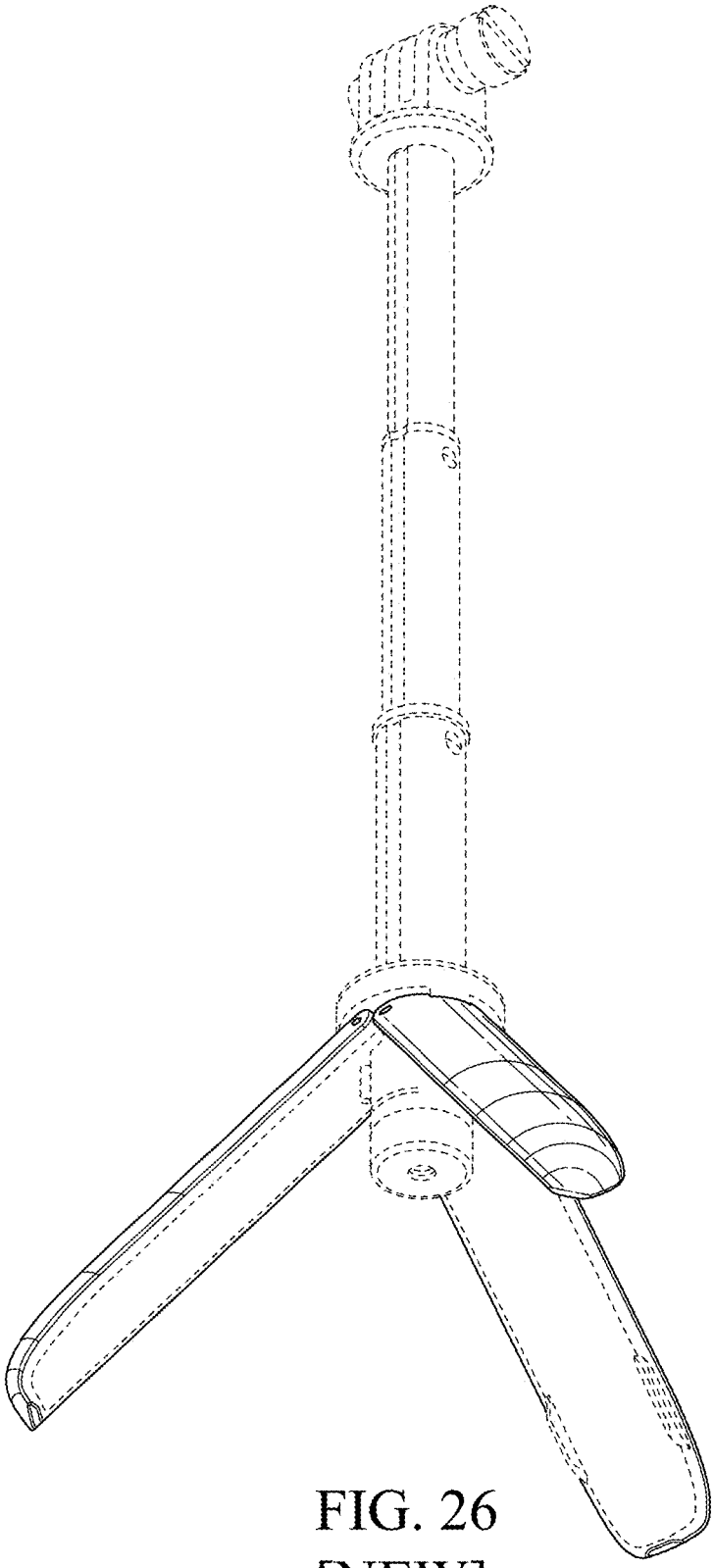
FIG. 26
[NEW]

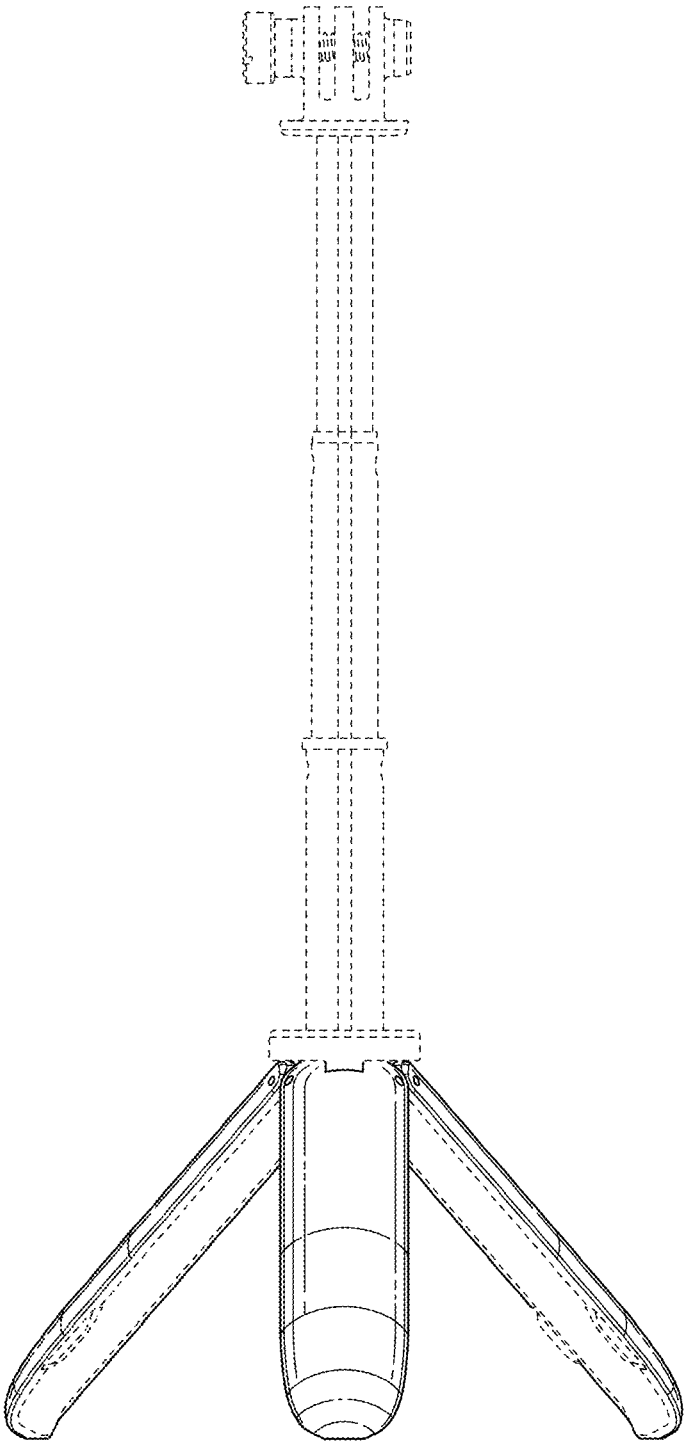
FIG. 27
[NEW]

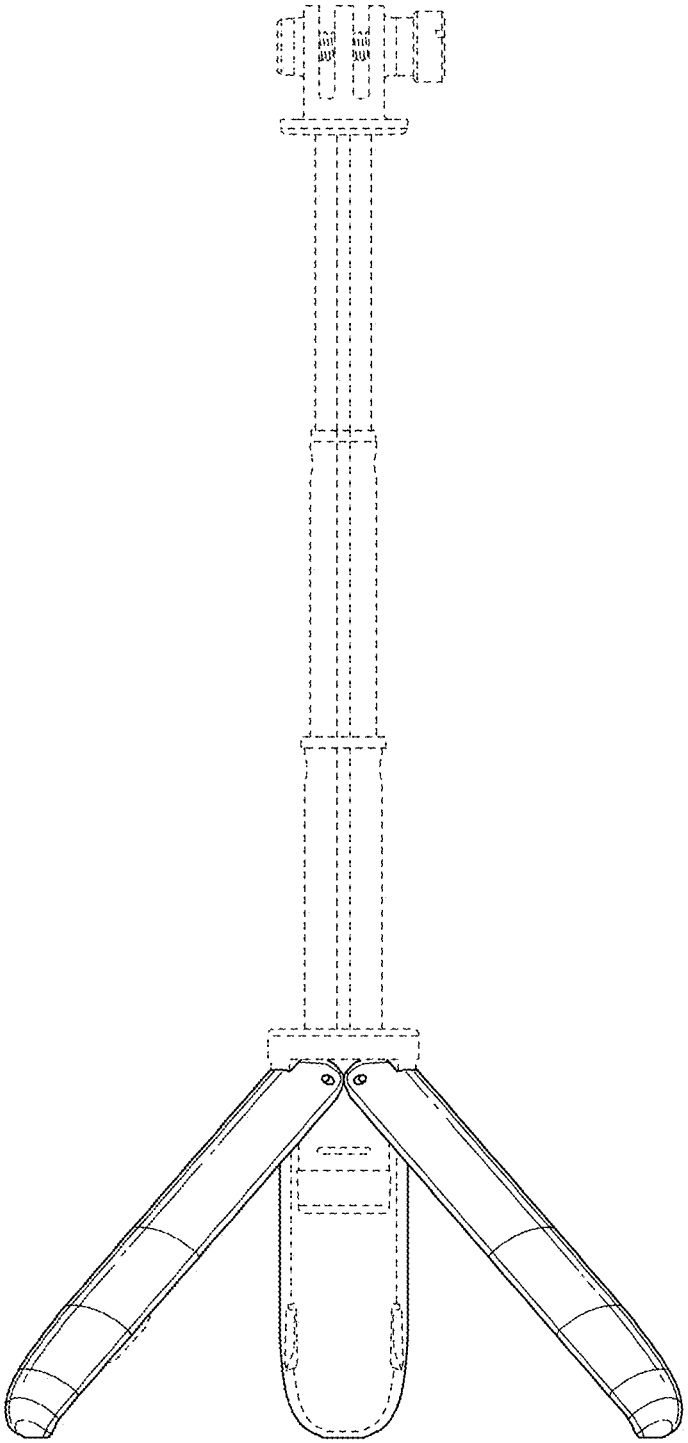
FIG. 28
[NEW]

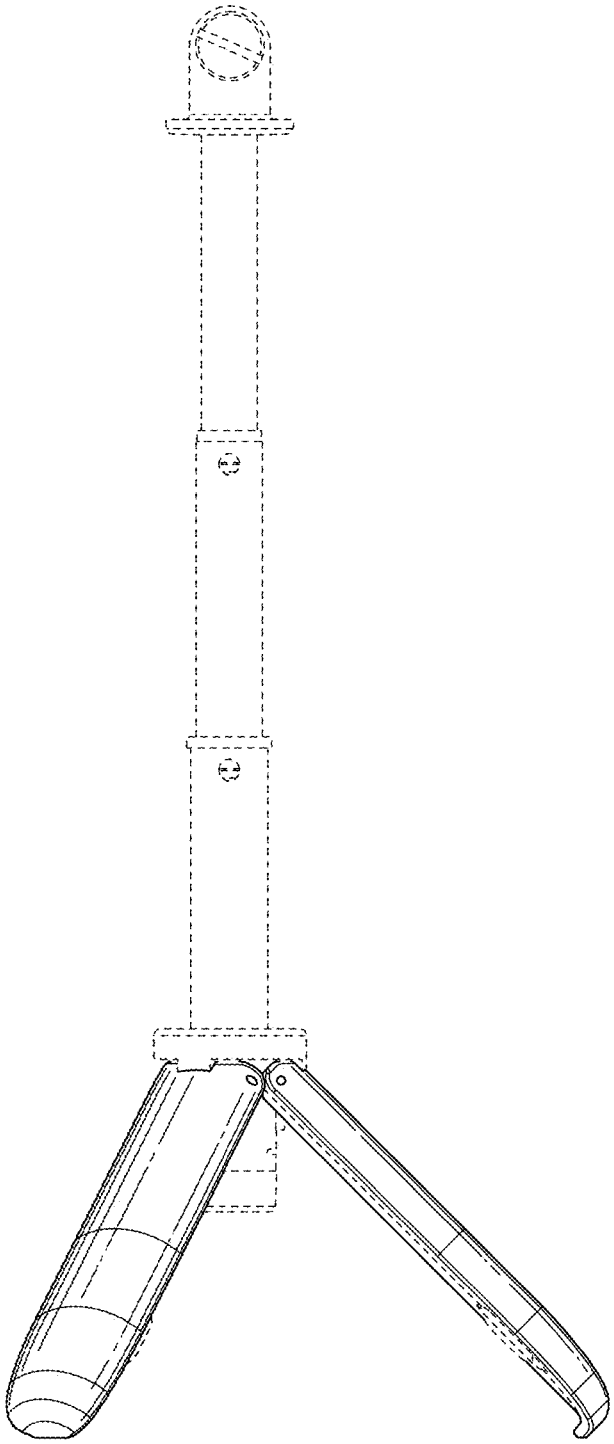
FIG. 29
[NEW]

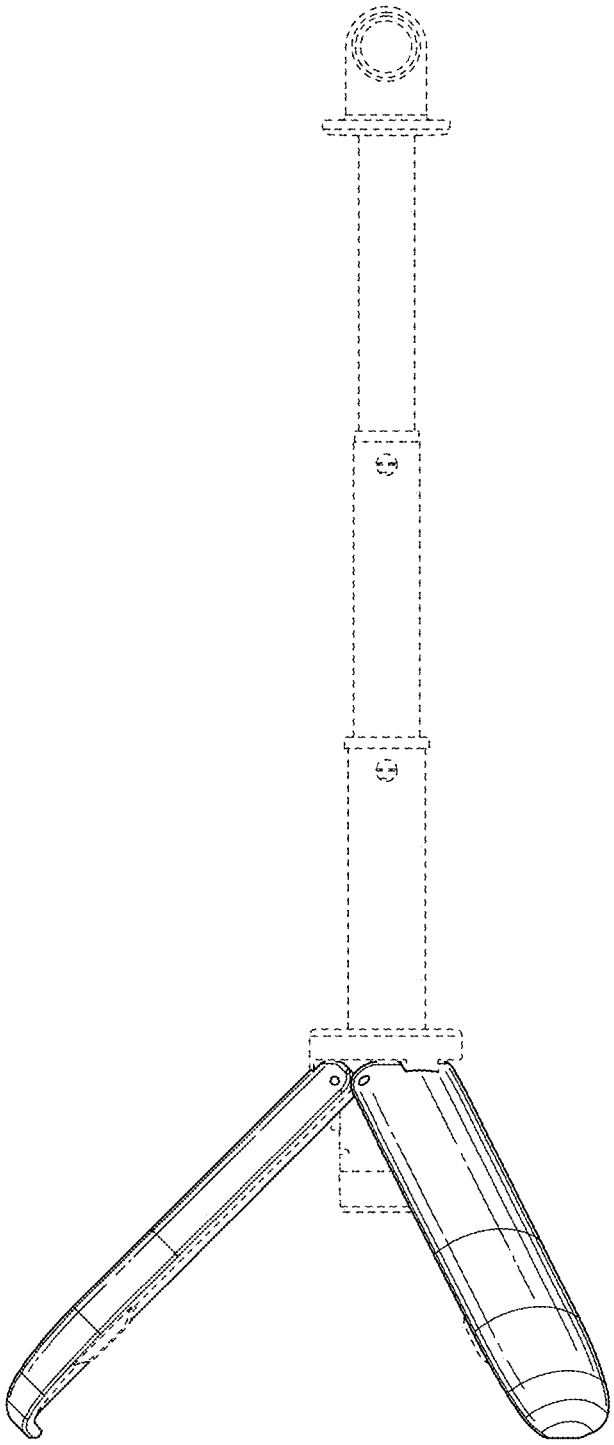
FIG. 30
[NEW]

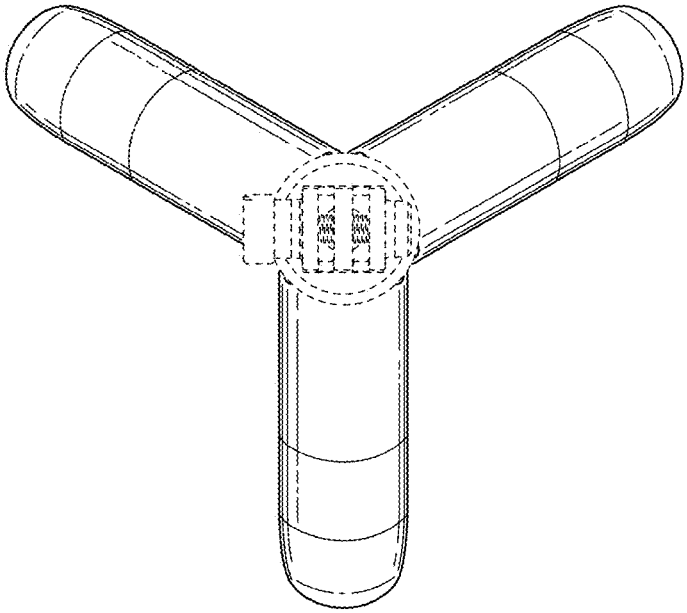
FIG. 31
[NEW]
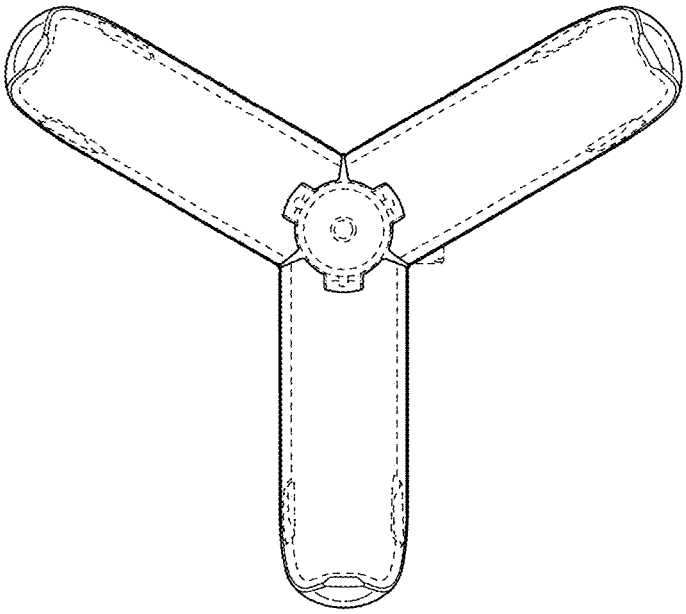
FIG. 32
[NEW]